United States Patent [19]

Hakamada et al.

[11] Patent Number: 5,099,326

[45] Date of Patent: Mar. 24, 1992

[54] TELEVISION RECEIVER WITH OPERATIONAL MODE FOR AGING

[75] Inventors: Kunio Hakamada; Takashi Otani, both of Saitama, Japan

[73] Assignee: Sony Corporation, Tokyo, Japan

[21] Appl. No.: 550,077

[22] Filed: Jul. 9, 1990

[30] Foreign Application Priority Data

Jul. 14, 1989 [JP] Japan ................. 1-181929

[51] Int. Cl.⁵ .................. H04N 17/00; H04N 17/02
[52] U.S. Cl. ........................ 358/139; 358/10
[58] Field of Search ............ 358/139, 10, 188

[56] References Cited

U.S. PATENT DOCUMENTS

| | | | |
|---|---|---|---|
| 4,237,475 | 12/1990 | Sekiguchi | 358/10 |
| 4,272,777 | 6/1981 | Fitzgerald | 358/10 |
| 4,406,971 | 9/1983 | Takano et al. | 358/10 |
| 4,414,567 | 11/1983 | Berke et al. | 358/10 |
| 4,731,564 | 3/1988 | Pan et al. | 358/10 |
| 4,769,703 | 9/1988 | Osborne et al. | 358/139 |
| 4,858,006 | 8/1989 | Suzuki et al. | 358/139 |

*Primary Examiner*—James J. Groody
*Assistant Examiner*—Glenton Burgess
*Attorney, Agent, or Firm*—Hill, Van Santen, Steadman & Simpson

[57] ABSTRACT

A television receiver with a remote control function is provided with a novel and unique operational mode to be used during an aging process in a manufacturing line. The operational mode is to be used during the aging process, and is adapted to reproduce a predetermined picture image pattern, such as an entirely white image. Also, the television receiver in the aging mode may disable the remote control function during the aging process.

18 Claims, 2 Drawing Sheets

TELEVISION RECEIVER WITH OPERATIONAL MODE FOR AGING

BACKGROUND OF THE INVENTION

The present invention relates generally to a novel television receiver which has a unique operational mode for simplification of an aging process for the receiver during production and thus for assisting reduction of production cost.

In the electronic and electric industries, it is a normal process to subject electronic parts or electric products to an aging process for reducing initial faults or fluctuations of characteristics. In the manufacture of televisions, the produced television is subjected to an aging process to maintain a display ON condition at a predetermined temperature for a given period, e.g. several hours. Usually, this aging process is performed downstream of an assembling section in a manufacturing line. The aging section is formed by surrounding a conveyor line by partitions and providing an inlet and outlet to define an aging room. The conveyor line in the aging room is driven at a predetermined speed which is set so as to transfer the television receiver from the inlet to the outlet in the predetermined aging period.

In the modern television receiver, it is a current trend to provide a remote control capability for remotely controlling a power switch, a channel selector switch, a volume control switch, and so forth. On the other hand, the modern television receiver is provided with a function not to blink unless a television signal is received. Furthermore, the television receiver which has an external input terminal for a video tape recorder, will not blink unless a video signal is input.

In the factory, not only the aging process but also testing, inspection processes, and so forth are performed. In testing processes, inspection processes, and so forth, a remote controller is used. As a result, various remote control signals simultaneously exist in the factory. Such remote control signals in the factory can influence operation of the television receiver in the aging process. Namely, if the television receiver receives the power OFF command, the television is powered OFF, thus disabling the aging process. similarly, when a video input mode is selected, blinking of a display is terminated due to the absence of an input video signal.

In this connection, it is conventional to perform the aging process so as to continuously supply television signals in the aging room so that all displays of the television receivers being subjected to aging may display a predetermined image. Furthermore, in order to maintain all the televisions in the aging room in a powered ON state, a power ON command is also constantly supplied.

In such a conventional aging process, in order to enable each television receiver to receive the television signal, a room antenna has to be provided for each television receiver. This makes the aging process inefficient. Furthermore, even given the presence of the television signal and the power ON signal, the aging process may not be successfully performed when the television receiver reacts to the video input command and is switched into a video input mode.

SUMMARY OF THE INVENTION

It is an object of the present invention to provide a novel television receiver which has a unique operational mode useful in the aging process for simplification of the aging process.

According to one aspect of the invention, the television receiver comprises:
- a display means;
- a remote control receiver;
- a mode selector means for selecting one of a plurality of preset operational modes of the television receiver, the preset operational modes including an aging mode to be used for an aging process in a manufacturing line; and
- a control means for controlling operation of the television receiver according to an operational mode which has been set, the control means being responsive to a setting of the aging mode so as to operate the display means to reproduce a predetermined pattern thereon.

The predetermined pattern to be reproduced during the aging process may be an entirely white pattern.

According to another aspect of the invention, the control means for controlling operation of the television receiver according to a set operational mode is preferably responsive to a setting of the aging mode so as to disable a remote control function.

The control means performs disablement of the remote control by inhibiting reception of remote control function signals through the remote control receiver. Preferably, the television receiver further comprises a last power memory which stores the operating mode status of the television receiver at the instant when power supply to the television receiver is terminated. The last power memory may be active during the aging mode of operation so that the aging mode is aborted when power is down.

According to a still further aspect of the invention, a display monitor unit comprises:
- a display means for reproducing a picture image on a display screen;
- a remote control receiver receiving first control commands for ordering one of a plurality of operations;
- a built-in command means which is manually operable for generating second control commands, each ordering one of a plurality of operational modes;
- an aging mode command means for commanding an aging mode which is active during an aging process in a manufacturing line, the aging mode command means generating an aging mode activating command in response to entry of an aging mode command; and
- a controller means receiving the first and second control commands for performing a control operation in a commanded operational mode, the controller means being responsive to the aging mode activating command for controlling operation of the display means in the aging mode such that the display means reproduces a predetermined picture image pattern for the aging mode.

The aging mode command means may be incorporated in the builtin command means. Also, the controller means operates the display means for reproducing an entirely white picture image during the aging operation. In addition, the controller means is preferably responsive to the aging mode activating command for disabling a remote control function. In such a case, the controller means inhibits entry of a first control command for disabling the remote control function during the aging mode of operation.

On the other hand, the display monitor unit further comprises means for maintaining the aging mode activating command as long as a main power switch is maintained in an ON state. Therefore, the aging mode activating command may terminate the aging mode activating command in response to switching OFF of the main power switch.

BRIEF DESCRIPTION OF THE DRAWINGS

The present invention will be understood from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENTS

Figure 1:
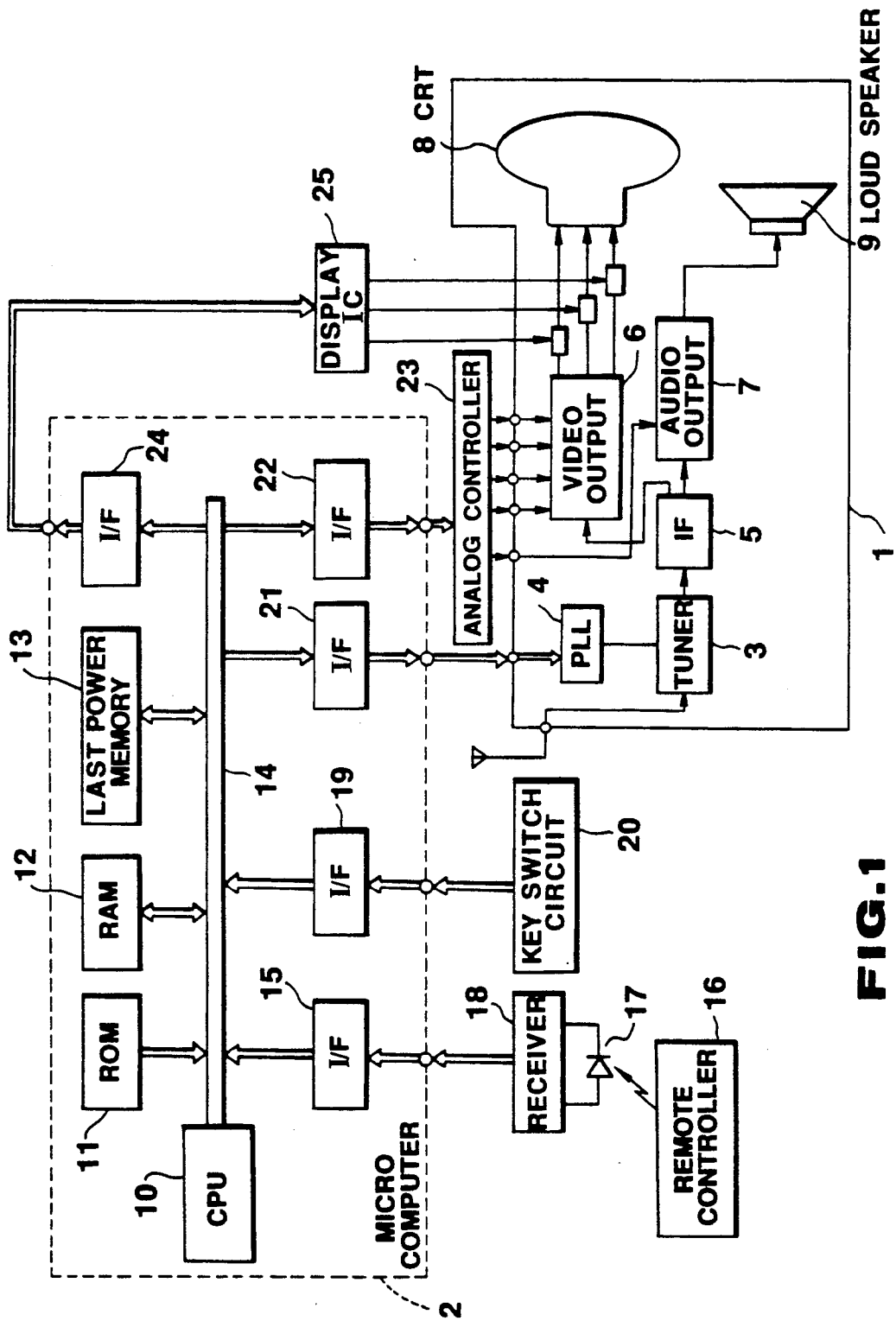
FIG. 1 is a block diagram of the preferred embodiment of a television receiver circuit according to the invention.

Referring now to the drawings, particularly to FIG. 1, the preferred embodiment of a television receiver circuit 1 according to the present invention is associated with a microcomputer 2.

The television receiver circuit 1 includes a tuner 4, a channel selection PLL circuit 4, an IF amplifier circuit 5, a video output circuit 6, an audio output circuit 7, a cathode ray tube 8 and a speaker. On the other hand, the microcomputer 2 has CPU 10, ROM 11, RAM 12, a last power memory 13 for storing a status of a load being controlled at a power OFF time, a system bus 14, and a remote control interface 15 for receiving a remote control signal. The remote control interface is designed to receive an infrared light remote command from a remote controller 16 via a photo diode 17 and a remote control signal receiver circuit 18. The remote controller 16 is designed to command channel selection, volume adjustment, and so forth. The microcomputer 2 also has another interface 19 which receives control commands entered by operation of key switches on the television receiver, and a key switch circuit 20 which is composed of the key switches installed on the television receiver. In the preferred embodiment, one of the key switches is designed to enter a command for operation in the aging mode. Another interface 21 is provided in the microcomputer for controlling channel selection. Also, an interface 22 is provided for feeding a control signal for an analog controller 23 which controls volume, HUE, brightness, and so forth. A display control interface 24 is connected to a display control IC 25 which controls the cathode ray tube 8.

Figure 2A:
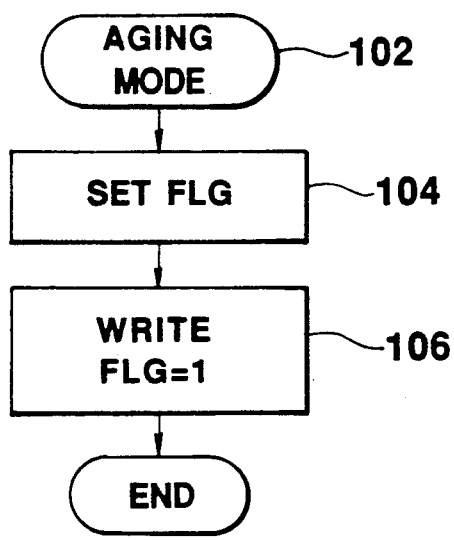
FIGS. 2(A) and 2(B) are flow charts showing an aging mode routine and main routine to be executed in the preferred embodiment of the television receiver circuit of FIG. 1.
Figure 2B:
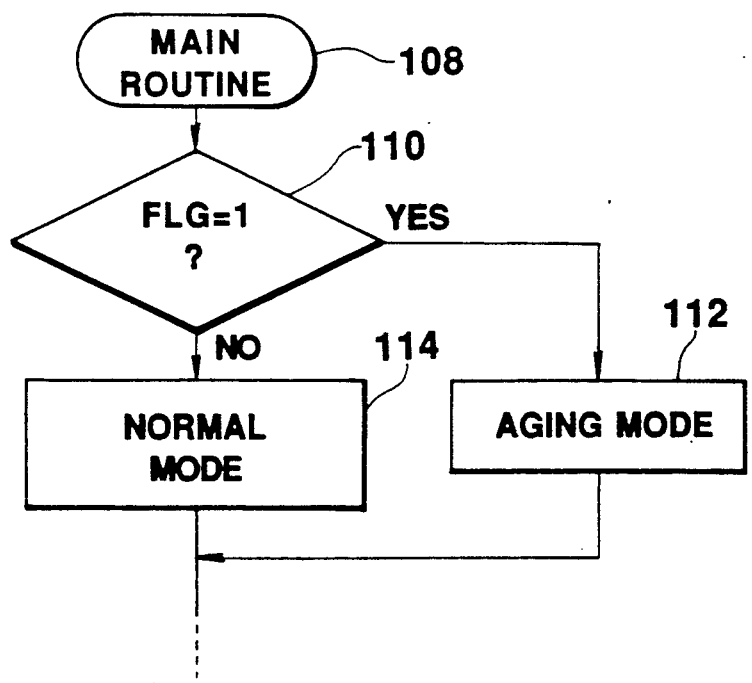

FIGS. 2(A) and 2(B) show programs to be executed by the microcomputer 2 in the preferred embodiment of the television receiver. In the routines shown, FIG. 2(A) illustrates a routine for setting the aging mode, and FIG. 2(B) illustrates a main routine relating to the invention, and which shows where the aging mode is performed in the display control.

As set forth, the aging mode operation is commanded through a relevant one of the key switches. In response to an aging mode command generated in response to manual operation of the key switch, the routine of FIG. 2(A) is triggered. Therefore, the process of the aging mode setting routine starts at a step 102. Immediately after starting, an aging flag FLG which indicates the active state of the aging mode is set at a step 104. Subsequently, at a step 106, a status data representing the set state of the aging mode flag FLG is written in the last power memory. The flag set state indicative of status data in the last power memory is used for automatic resumption of the aging mode after temporary power OFF in the aging line. Namely, in the aging line, the television receivers to be subject to the aging process are transferred by conveyor through a non-straight transfer route. Because of bending or curving of the transfer route of the conveyor system, a temporary power OFF can occur. With the status data representative of the set state of the aging mode flag in the last power memory, the aging mode setting, i.e. the set state of the aging mode flag FLG, can be automatically resumed in response to resumption of the power supply.

On the other hand, the main routine of FIG. 2(B) is executed periodically or cyclically at a predetermined timing, or is executed as a background job. As can be appreciated, the main routine is so programmed to govern various modes of television receiver operation. Since control operation is to be governed by the main routine, the process steps relevant to the aging mode of operation is not essential to an understanding of the subject matter of the invention, and therefore a detailed discussion thereof is not provided for simplification of the disclosure.

A block 108 labelled as a "main routine" represents various control processes to be performed by the microprocessor before reaching a step 110. At the step 110, the aging mode flag FLG is checked to determine whether it is in a set state or in a reset state. When the aging mode flag FLG is set, a judgment can be made that the aging mode is active. Then, the process goes to a step 112 in which a white picture is displayed on the display screen of the cathode ray tube 8. At the same time, the remote control function is disabled by inhibiting input of the command signal from the remote control signal receiver circuit 18. Disabling reception of the remote control signal from the remote control signal receiver circuit may be achieved by inhibiting the interface 15. By this, even when the channel selection command is entered from the remote controller, the television receiver in the aging process will never react to such a remote control command.

On the other hand, if the aging mode flag FLG as checked at step 110 is in the reset state, a judgment is made that the aging mode is not active. Then, the process goes to a step 114 for enabling remote control by permitting entry of the remote control signal from the remote control signal receiver circuit 18.

It should be appreciated that the aging mode operation is terminated by switching the power switch of the television receiver OFF.

As can be appreciated, the television receiver according to the present invention thus permits the aging process in the manufacturing line easily without requiring an external video signal. Furthermore, according to the invention, the influence of environmental remote control commands can be successfully avoided.

While the present invention has been disclosed in terms of the preferred embodiment in order to facilitate better understanding of the invention, it should be appreciated that the invention can be embodied in various ways without departing from the invention. Therefore, the invention should be understood to include many other possible embodiments and modifications .

We claim as our invention:

1. A television receiver, comprising:
   a display means;
   a remote control receiver means for receiving remote control function signals transmitted by an operator who is at a location remote form the receiver and which provide commands for operational modes;
   a mode selector means connected to the remote control receiver means for selecting one of a plurality of preset operational modes of the television receiver, said preset operational modes including an aging mode to be used for an aging process in a manufacturing line; and
   a control means for controlling operation of the television receiver according to an operational mode which has been set, said control means being responsive to a setting of said aging mode so as to operate said display means to reproduce a predetermined aging pattern thereon during said aging mode.

2. A television receiver according to claim 1 wherein said predetermined pattern to be reproduced during said aging process is an entirely white pattern.

3. A television receiver, comprising:
   a display means;
   a remote control receiver means for receiving remote control function signals transmitted by an operator who is at a location
   a mode selector means for selecting one of a plurality of preset operational modes of the television receiver, said preset operational modes including an aging mode to be used for an aging process in a manufacturing line; and
   a control means for controlling operation of the television receiver according to an operational mode which has been set, said control means being responsive to a setting of said aging mode so as to disable said remote control function during said aging mode.

4. A television receiver, comprising:
   a display means;
   a remote control receiver means for receiving remote control function signals;
   a mode selector means for selecting one of a plurality of preset operational modes of the television receiver, said preset operational modes including an aging mode to be used for an aging process in a manufacturing line;
   a control means for controlling operation of the television receiver according to an operational mode which has been set, said control means being responsive to a setting of said aging mode so as to disable said remote control function; and
   said control means performing disablement of the remote control function by inhibiting reception of said remote control function signals through said remote control receiver means.

5. A television receiver, comprising:
   a display means;
   a remote control receiver;
   a mode selector means for selecting one of a plurality of preset operational modes of the television receiver, said preset operational modes including an aging mode to be used for an aging process in a manufacturing line;
   a control means for controlling operation of the television receiver according to an operational mode which has been set, said control means being responsive to a setting of said aging mode so as to operate said display means to reproduce a predetermined pattern thereon; and
   last power memory means for storing an operational mode status of the television receiver at the instant when power supply to the television receiver is terminated.

6. A television receiver according to claim 5 wherein said last power memory means is active during aging mode operation.

7. A television receiver, comprising:
   a display means;
   a remote control receiver;
   a mode selector means for selecting one of a plurality of preset operational modes of the television receiver, said preset operational modes including an aging mode to be used for an aging process in a manufacturing line;
   a control means for controlling operation of the television receiver according to an operational mode which has been set, said control means being responsive to a setting of said aging mode so as to operate said display means to reproduce a predetermined pattern thereon; and
   said aging mode being aborted when powder is down.

8. A display unit, comprising:
   a display means for reproducing a picture image on a display screen;
   a remote control receiver means for receiving remote control function signals transmitted by an operator at a location remote from the display unit and for providing first control commands for ordering one of a plurality of operational modes;
   a built-in command means which is manually operable for generating second control commands, each ordering one of a plurality of operational modes;
   an aging mode command means for commanding an aging mode which is active during an aging process in a manufacturing line, said aging mode command means generating an aging mode activating command in response to entry of an aging mode command; and
   a controller means receiving said first or second control commands for performing a control operation in a commanded operational mode, said controller means being responsive to said aging mode activating command for controlling operation of the display means in said aging mode such that said display means reproduces a predetermined picture image pattern for the aging mode.

9. A display unit according to claim 8 wherein said aging mode command means is incorporated in said built-in command means.

10. A display unit according to claim 9 wherein said controller means operates said display means for reproducing an entirely white picture image during the aging mode.

11. A display unit according to claim 8 wherein said controller means is responsive to said aging mode activating command for disabling a remote control function.

12. A display unit according to claim 11 wherein said controller means inhibits entry of a first control command for disabling said remote control function during the aging mode.

13. A display unit according to claim 8 further comprising means for maintaining said aging mode activating command as long as a main power switch is maintained in an ON state.

14. A display unit according to claim 13 wherein said aging mode activating command maintaining means terminates said aging mode activating command in response to switching OFF of said main power switch.

15. A video display aging system, comprising:
a video display means;
said video display means having an aging mode selector means for selecting an aging mode to be used for an aging process in a manufacturing line for the display means; and a control means connected to said aging mode selector means for controlling operation of the display means to provide an aging mode display in said aging mode when said aging mode selector means has been activated to select the aging mode.

16. A display unit according to claim 15 wherein said control means operates said display means to reproduce a predetermined pattern thereon during the aging process.

17. A system according to claim 16 wherein said predetermined pattern is entirely white during the aging process.

18. A display unit according to claim 15 wherein said display mans includes a remote control receiver means for providing a remote control function, and said control means disabling said remote control function during the aging mode.

* * * * *